(12) United States Patent
Davenport et al.

(10) Patent No.: US 7,392,834 B2
(45) Date of Patent: Jul. 1, 2008

(54) PROTECTION DEVICE WITH REPLACEABLE ADAPTOR PARTS

(75) Inventors: Mark Davenport, Macomb, MI (US); Mike Uhazie, Oakland Township, MI (US); Carsten Meyer, Rochester Hills, MI (US); Herbert Walter, Ebersbach (DE)

(73) Assignee: BOS GmbH & Co. KG, Ostfildern (DE)

( * ) Notice: Subject to any disclaimer, the term of this patent is extended or adjusted under 35 U.S.C. 154(b) by 84 days.

(21) Appl. No.: 11/251,621

(22) Filed: Oct. 14, 2005

(65) Prior Publication Data

US 2007/0084572 A1  Apr. 19, 2007

(51) Int. Cl.
*E06B 9/17* (2006.01)
(52) U.S. Cl. .................. 160/24; 160/323.1; 242/599.3; 296/37.16
(58) Field of Classification Search ................ 160/23.1, 160/24, 21, 263, 370.22, 318, 313, 323.1, 160/324; 296/37.16; 242/599.3
See application file for complete search history.

(56) References Cited

U.S. PATENT DOCUMENTS 1,736,527 A * 11/1929 Garcia ......................... 160/21
4,168,094 A    9/1979 Yagi
4,222,601 A    9/1980 White et al.
4,781,234 A * 11/1988 Okumura et al. ........... 160/23.1
5,813,449 A    9/1998 Patmore et al.
2007/0051475 A1* 3/2007 Wieczorek et al. ............ 160/24

FOREIGN PATENT DOCUMENTS

DE  29 41 711      4/1980
DE  199 15 173 C1  5/2000
EP  0 652 136 A2   5/1995
EP  0 754 594 A2   1/1997

OTHER PUBLICATIONS

European Patent Office Search Report dated Feb. 23, 2007 (12 pages).

* cited by examiner

*Primary Examiner*—Blair M. Johnson
(74) *Attorney, Agent, or Firm*—Flynn, Thiel, Boutell & Tanis, P.C.

(57) ABSTRACT

1. Protection device with replaceable adaptor parts.
2.1. The invention relates to a protection device for a motor vehicle with a blind or screen functional unit comprising a flexible fabric which can be wound up and down with respect to a blind or screen shaft and which is terminally provided with adaptor parts replaceably fittable to end caps of the screen functional unit for a vehicle-individual, positive and/or non-positive fitting within a vehicle interior.
2.2. Use for a vehicle interior.

19 Claims, 5 Drawing Sheets

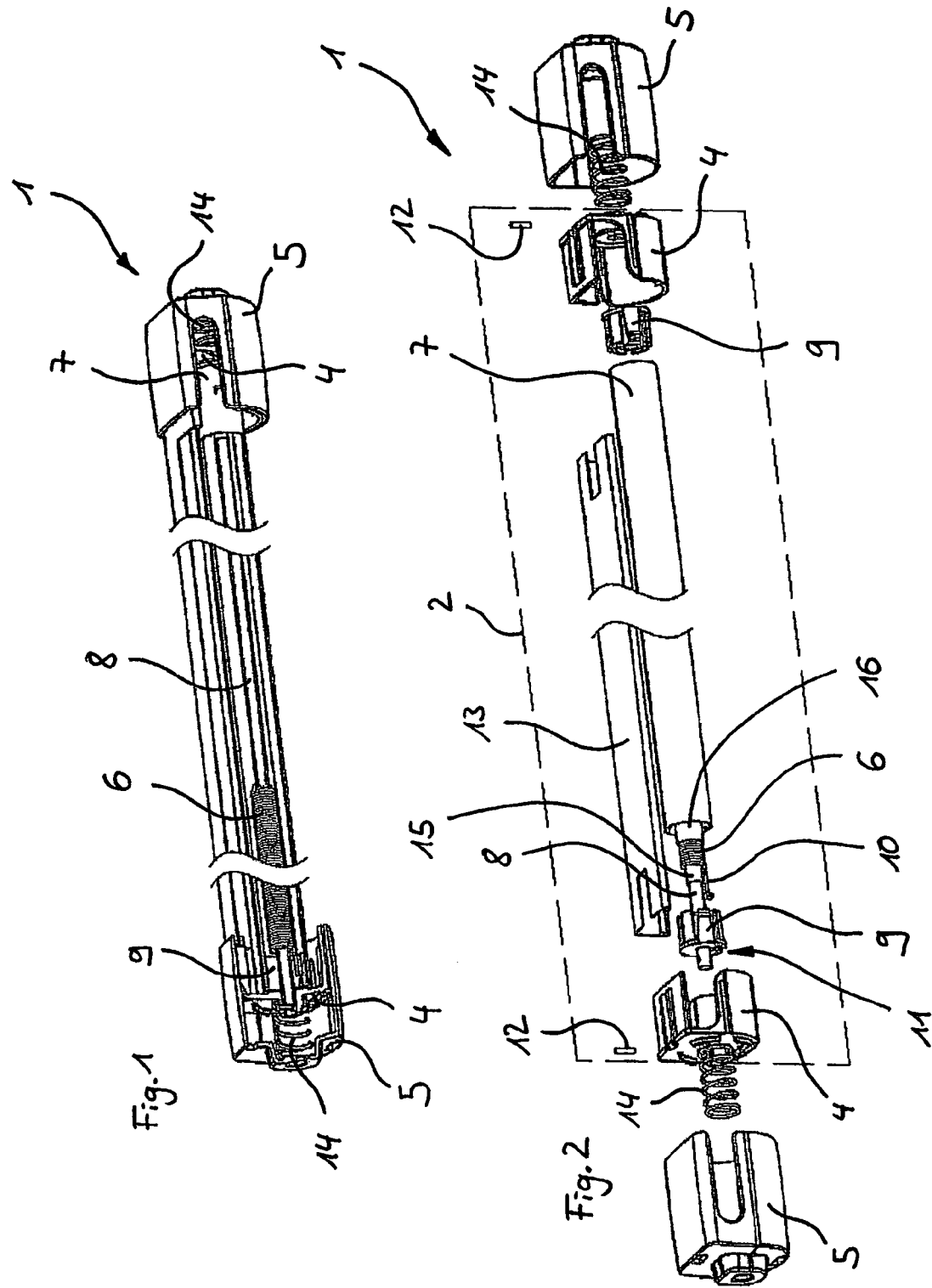

PROTECTION DEVICE WITH REPLACEABLE ADAPTOR PARTS

Figure 3:
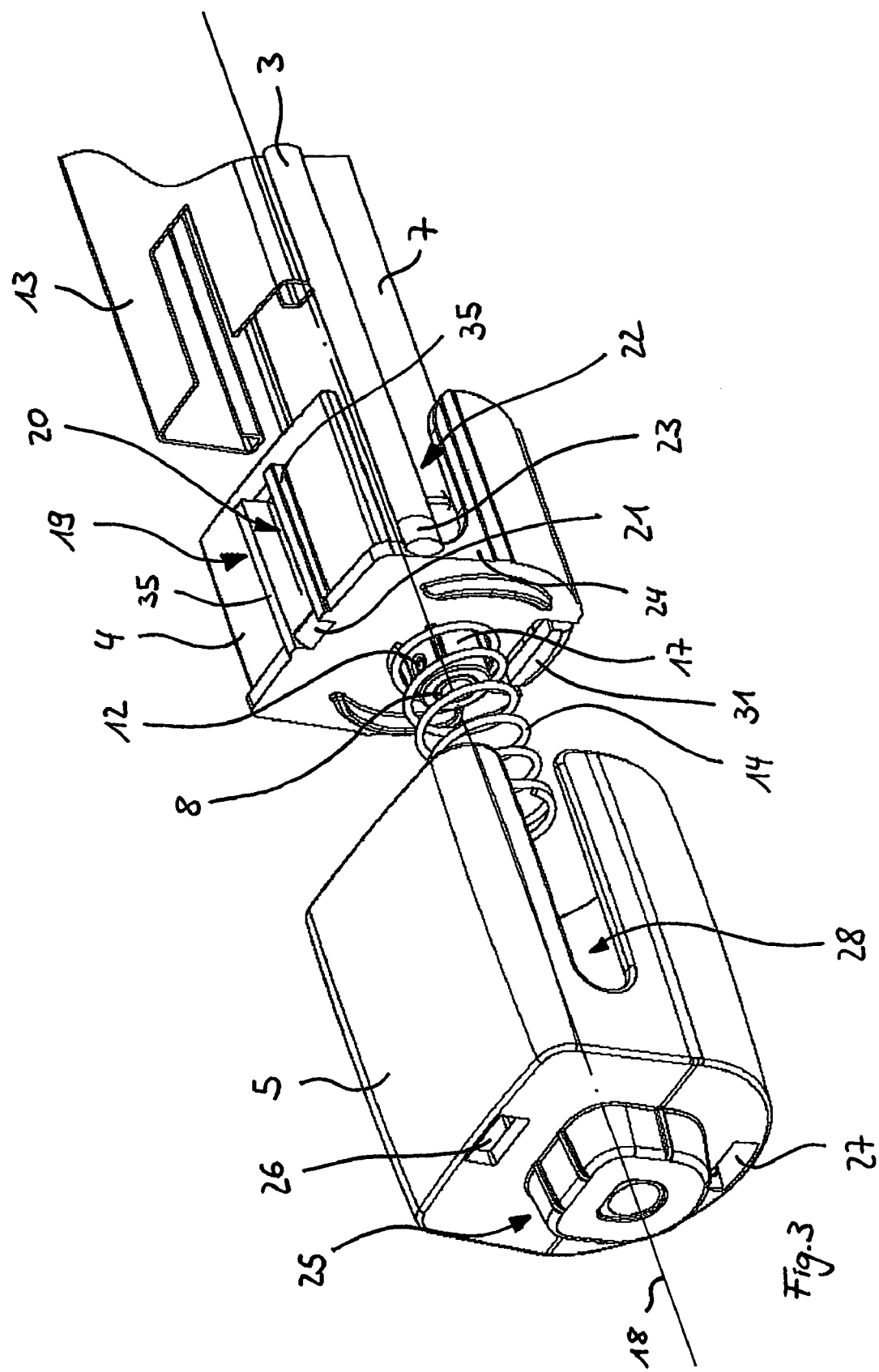

The invention relates to a protection device for a motor vehicle having a flexible fabric element which can be wound from a window shade or blind shaft.

The prior art discloses protection devices for motor vehicles. Such protection devices are used in the interior of a motor vehicle, particularly as a safety separating net for separating a loading or luggage area section from a passenger section, as a viewing or sun protection or screen for the loading or luggage area and/or as a sun screen for vehicle windows.

DE 29 41 711 C2 discloses a protection device constructed as a shade for covering a rear loading area of a motor vehicle. The shade has a shaft and a roll coaxially surrounding said shaft and between shaft and roll there is a tensioned torsion spring in order to allow an automatic winding up of a cover fixed to the roll. To the end regions of the shaft are fixed caps intended for hanging in fixed mounting supports of the motor vehicle. For fixing in the rear loading area of the motor vehicle, the aforementioned prior art proposes fixing the screen to the tailgate or to the rear of the back seat. To this end a cap can be axially displaced against a spring tension in order to bring about a locking of the screen in a corresponding receptacle in the rear loading area of the vehicle.

The problem of the invention is to provide a protection device easily adaptable to different motor vehicles.

This problem is solved by a protection device of the aforementioned type where a blind or screen functional unit is provided comprising a fabric which can be wound up and down from a screen shaft, adaptor parts terminally fittable to end caps of the screen functional unit being provided for a vehicle-individual, positive and/or non-positive fitting in a vehicle interior, the screen or shade shaft being mounted in rotary manner on the end caps and at least one end cap has at least two circumferentially spaced supporting sections, which are designed for a positive force transmission to an adaptor part. The end caps, which can in particular be connected rigidly to the screen shaft, permit a direct transmission of forces and torques acting on the flat article to the adaptor parts. The design of the end caps with at least two supporting sections, which can in particular be constructed as guide surfaces, guide webs or guide grooves, permits the positive transmission of forces and torques to the adaptor parts. Through the arrangement of the supporting sections in the circumferential direction of the end cap, i.e. on the flat sections extending in the manner of a sleeve surface relative to a rotation axis of the screen shaft, an advantageous force and torque transmission can be ensured. Through the use of adaptor parts which can be positively mounted on the end caps and which absorb the forces and torques on the flat article via supporting surfaces designed in corresponding manner to the supporting sections of the end caps, it is possible to adapt a protection device to different vehicles, without having to constructionally intervene on the screen functional unit. Thus, a vehicle-individual adaptation of the protection device to the circumstances in the particular vehicle takes place solely through the fitting of the vehicle-adapted adaptor parts to the end caps, so that the difficulty manufacturable screen functional unit can be used without modifications for a large number of vehicles. If adaptations are necessary with regards to the length and/or width of the flexible fabric, e.g. within a family of models of a vehicle manufacturer, this does not influence the remaining functions of the protection device, such as the locking of the screen functional unit in the vehicle interior.

According to a development of the invention the supporting sections form a substantially closed, at least sectionally U-shaped cross-section of the end cap in a plane normal to a rotation axis of the shade or screen shaft. By means of a U-shaped cross-section it is possible to implement an appropriate, stable cross-sectional geometry for the end cap. The two U-legs of the U-shaped cross-section are inter-connected via a web for stabilization purposes, so that a closed contour can be obtained. Through the cross-section of the end cap it is possible to obtain a positive transmission of forces and torques to the adaptor parts by means of the curved or planar faces of the U-shaped contour. Tilting moments on the end caps are also transmitted via the supporting sections to the adaptor parts, which can be firmly locked in a luggage area of a motor vehicle and which can in turn transmit the forces and torques to said luggage area.

In a further development of the invention the at least one end cap has at least one guide web extended in the axial direction of the screen shaft for the adaptor part. By means of the guide web, which in particular projects in raised manner over the substantially U-shaped cross-section of the end caps, it is possible to guide the adaptor part in the direction of the rotation axis of the screen shaft. This provides additional security for the transmission of tilting moments between the end cap and adaptor part. The guide web can also serve as a spacer between the adaptor part and a magazine housing fittable to the end cap. This avoids undesired noise which can occur in the case of relative movements between adaptor part and magazine housing. As a result of the guide web the adaptor part has no direct mechanical contact with the magazine housing.

In a further development of the invention the at least one end cap has at least one guide groove for a slidable guidance of the adaptor part. With the aid of the guide groove in which more particularly engages a detent associated with the adaptor part, additional supporting sections can be made available permitting a force and torque transmission. The guide groove can also be used for limiting the travel of the slidable adaptor part to avoid undesired removal of said adaptor part.

According to a development of the invention the screen functional unit is constructed for winding and unwinding the flexible flat article by means of a spring mechanism and has stop means for maintaining a pretension of the spring mechanism in the wound up position. Thus, the screen functional unit constitutes an independently functioning subassembly for the protection device. Except for the interface to the locking in the interior of the vehicle, said subassembly already has all the functionalities essential for the protection device. Particular importance is attached to the fact that the screen functional unit is so designed that even when the flexible fabric is completely wound up and in the absence of adaptor parts a preloading of the spring mechanism can be ensured. Spring preloading in the wound up position of the flexible fabric is provided in order to ensure a correct winding up of the flexible fabric. Thus, the screen functional unit can be prefitted as an independent subassembly and made ready to operate and can be produced in vehicle-individual manner by simply mounting the adaptor parts.

According to a further development of the invention, the screen shaft has terminally fitted bearing bushes for a rotary operative connection with a coaxially arranged screen spindle, the end caps being firmly connected to end portions of the screen spindle. The bearing bushes, which are in particular firmly connected to the screen shaft and act with respect to the screen spindle as plain bearings for screen shaft rotation, permit in simple manner the rotary coupling of the screen shaft to the screen spindle. The firm connection of the end caps to the end portions of the screen spindle makes it possible for a torque applied by the spring mechanism to the screen spindle and which appears as a winding moment or torque for the flexible fabric in the outwards direction, is led off via the end caps into the fixing of the protection device in the vehicle interior.

According to a further development of the invention, at least one bearing bush is constructed as a receptacle for an end region of the spring mechanism. Consequently the bearing bush has a double function, namely serving to transmit a torque to be transmitted from the spring mechanism to the screen shaft and the mounting of the screen shaft on the screen spindle. This makes it possible to implement a particularly simple, inexpensive and weight-optimized protection device, in which a favourable force flow between screen spindle, spring mechanism and screen shaft is ensured.

According to a further development of the invention, at least one bearing bush has a radially extended, circumferential collar with a diameter larger than the internal diameter of the screen shaft. The collar ensures that on installing the bearing bush in the screen shaft a predefined bearing bush position relative to the screen shaft is assumed. In the case of a suitable design of the collar there is no need for the complicated machining of the end face of the screen shaft, e.g. deburring, because said end face is covered by a circumferential collar.

According to a further development of the invention, at least one bearing bush has locking means constructed for positive reception in the screen shaft. This makes it possible to implement an advantageous fitting of the bearing bush in the screen shaft and on the latter can be provided reception areas designed so as to correspond to the locking means. The locking means can e.g. be in the form of detents, which are elastically connected, particularly via solid joints to the bearing bush and engage behind the corresponding locking geometries in the screen shaft.

According to a further development of the invention, the end caps are constructed as abutments for a dimensionally stable extraction profile provided on the flexible fabric, so that when the flexible fabric is wound up, a preloading of the spring mechanism can be maintained. The dimensionally stable extraction profile, which is in particular provided with locking areas projecting laterally out of the flexible fabric, in the winding up position engages with at least one end cap of the screen functional unit. This prevents a further screen shaft rotation relative to the screen spindle, so that the preloading of the spring mechanism necessary for a correct winding up process can be maintained. Thus, the end caps ensure that the screen functional unit, after fitting, without adaptor parts and without fitting in a motor vehicle interior is ready to operate and that the preloading force of the spring mechanism applied during fitting is not lost.

According to a further development of the invention, at least one adaptor part is movably fitted to an end cap. As a result of a movable fitting of the replaceable adaptor part, in advantageous manner a positive and/or non-positive locking of the protection device in a vehicle interior can be achieved. For this purpose the adaptor part can be slid from an unlocking position into a locking position and vice versa. A movement of the adaptor part with respect to the end cap can be provided as a linear and/or rotary movement. A linear movement is particularly advantageous if the adaptor part is also to be provided for transmitting a torque between the screen spindle and the vehicle. A rotation or a combination of a linear movement and a rotation is appropriate for a particularly reliable locking of the adaptor part or the protection device in the vehicle interior.

According to a further development of the invention, a spring mechanism is provided between the end cap and the adaptor part. With a locking energy stored in the spring mechanism the adaptor part can be brought into and maintained in a locking position with respect to the end cap. For an unlocking process, the user must bring the adaptor part into an unlocking position counter to the spring preloading of the spring mechanism. This makes it possible in a simple manner to reliably lock the protection device to the vehicle.

According to a further development of the invention, between the end caps can be fitted a cover which at least partly embraces the spindle shaft, is fittable in positive and/or non-positive manner to at least one end cap and/or, without tools, at least one adaptor part can be connected to or removed from the end cap. The cover, which can be substantially dimensionally stable, is used for lining the screen shaft and the flexible fabric received thereon, in order to implement a corresponding optical design of the protection device. The cover, which can also be called a magazine housing, is substantially force-free in all protection device operating states. It can therefore in particular be made as a plastics part, e.g. as an extruded plastics profile, or as a metal part, particularly a shaped sheet metal part or extruded part. The cover and/or at least one adaptor part can be connected to and/or removed from the end cap without tools so as to bring about a particularly advantageous and simple adaptation to different motor vehicles, which ensures an easy installation of the protection device.

According to a further development of the invention, the spring mechanism is constructed as a helical spring and has at least one coaxially arranged damping sleeve. A spring mechanism constructed as a helical spring, particularly with a coaxial arrangement of the helical spring with respect to the screen shaft, permits a particularly compact protection device design. To ensure an advantageous noise behaviour of the helical spring during the winding up and down process and in the wound up and down state of the flexible fabric, with the helical spring is associated at least one coaxially positioned damping sleeve, particularly made from plastic. The damping sleeve is provided for reducing vibrations and relative movements of the helical spring and consequently soundproofs the protection device.

According to a further development of the invention, the screen functional unit and the at least one adaptor part is constructed so as to be lockable in crashproof manner to a vehicle interior. This ensures that in the case of strong vehicle braking, such as can occur in an accident, objects in the interior do not lead to an unlocking of the protection device with respect to said interior, which would cast doubts on the protection function. A crashproof locking can in particular be ensured if the adaptor parts have an adequate guidance length with respect to receptacles in the vehicle interior and with respect to the end caps and which have a design able to deal with the forces occurring in a crash. The same applies with regards to the dimensioning of the end caps, the flexible fabric, the screen shaft and the screen spindle.

According to a further development of the invention, between the end caps can be fitted a cover which at least partly embraces the spindle shaft, is fittable in positive and/or non-positive manner to at least one end cap and/or, without tools, at least one adaptor part can be connected to or removed from the end cap. The cover, which can be substantially dimensionally stable, is used for lining the screen shaft and the flexible fabric received thereon, in order to implement a corresponding optical design of the protection device. The cover, which can also be called a magazine housing, is substantially force-free in all protection device operating states. It can therefore in particular be made as a plastics part, e.g. as an extruded plastics profile, or as a metal part, particularly a shaped sheet metal part or extruded part. The cover and/or at least one adaptor part can be connected to and/or removed from the end cap without tools so as to bring about a particularly advantageous and simple adaptation to different motor vehicles, which ensures an easy installation of the protection device.

According to a further development of the invention, the spring mechanism is constructed as a helical spring and has at least one coaxially arranged damping sleeve. A spring mechanism constructed as a helical spring, particularly with a coaxial arrangement of the helical spring with respect to the screen shaft, permits a particularly compact protection device design. To ensure an advantageous noise behaviour of the helical spring during the winding up and down process and in the wound up and down state of the flexible fabric, with the helical spring is associated at least one coaxially positioned damping sleeve, particularly made from plastic. The damping sleeve is provided for reducing vibrations and relative movements of the helical spring and consequently soundproofs the protection device.

According to a further development of the invention, the screen functional unit and the at least one adaptor part is constructed so as to be lockable in crashproof manner to a vehicle interior. This ensures that in the case of strong vehicle braking, such as can occur in an accident, objects in the interior do not lead to an unlocking of the protection device with respect to said interior, which would cast doubts on the protection function. A crashproof locking can in particular be ensured if the adaptor parts have an adequate guidance length with respect to receptacles in the vehicle interior and with respect to the end caps and which have a design able to deal with the forces occurring in a crash. The same applies with regards to the dimensioning of the end caps, the flexible fabric, the screen shaft and the screen spindle.

In a further development of the invention a magazine housing is constructed as a stopping means for a dimensionally stable extraction profile provided on the flexible flat article, the extraction profile being constructable shorter than a minimum spacing between the end caps. The magazine housing can at least approximately completely embrace the screen shaft or can only sectionally extend around the same. Through the rigid coupling of the end caps to the screen or shade spindle and the positive force transmission from the end caps to the adaptor parts, the magazine housing is substantially free from forces and can be designed in optimum manner for the individual application with respect to the design and manufacturing costs. The magazine housing can in particular be received in floating manner between the end caps, i.e. it is fitted with a slight tolerance to said end caps. Through the use of the magazine housing as stopping means for the extraction profile it can be made shorter than the spacing between the end caps. This is in particular of interest for protection devices intended to cover a wide luggage or loading area, but which are terminally restricted in the region in which the extraction rod is to be hung in the functional position as a result of the motor vehicle wheel cases or by the drive means for the tailgate. This in particular leads to a V or T-shaped design of the flexible flat article and the extraction rod is shorter than the minimum spacing of the end caps fitted in the wide region of the luggage area. Due to the magazine housing the extraction rod is positively received in the rest position and consequently prevents further rotation of the screen shaft which would lead to a loss of pretension of the spring mechanism.

Further advantages and features of the invention can be gathered from the claims and the following description of a preferred embodiment relative to the attached drawings, wherein show:

FIG. 1 In a perspective sectional view, a protection device having a screen functional unit and terminally fitted adaptor parts.

FIG. 2 In a perspective exploded view, the protection device of FIG. 1.

FIG. 3 A perspective larger scale detail of an end region of the protection device in an exploded view.

Figure 4:
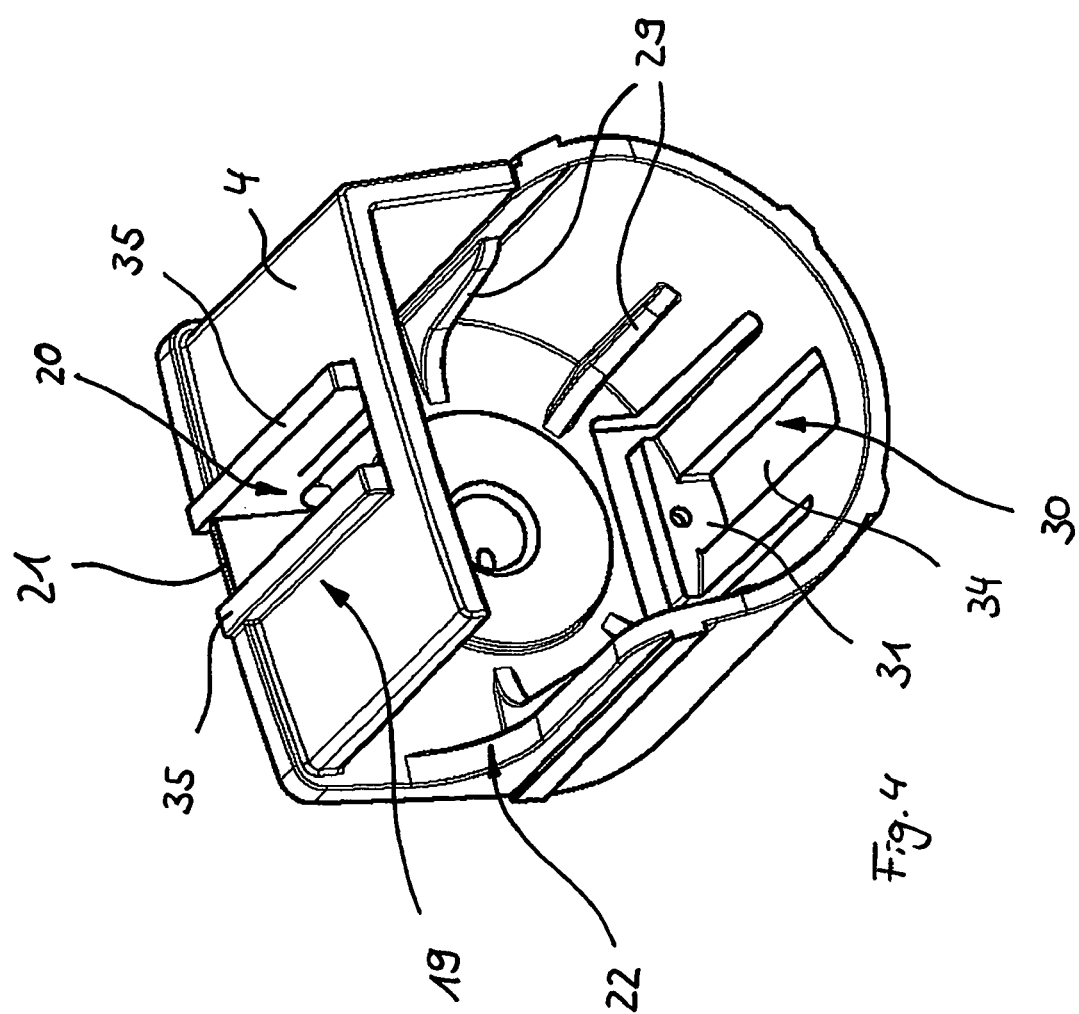

FIG. 4 A perspective view of an end cap.

Figure 5:
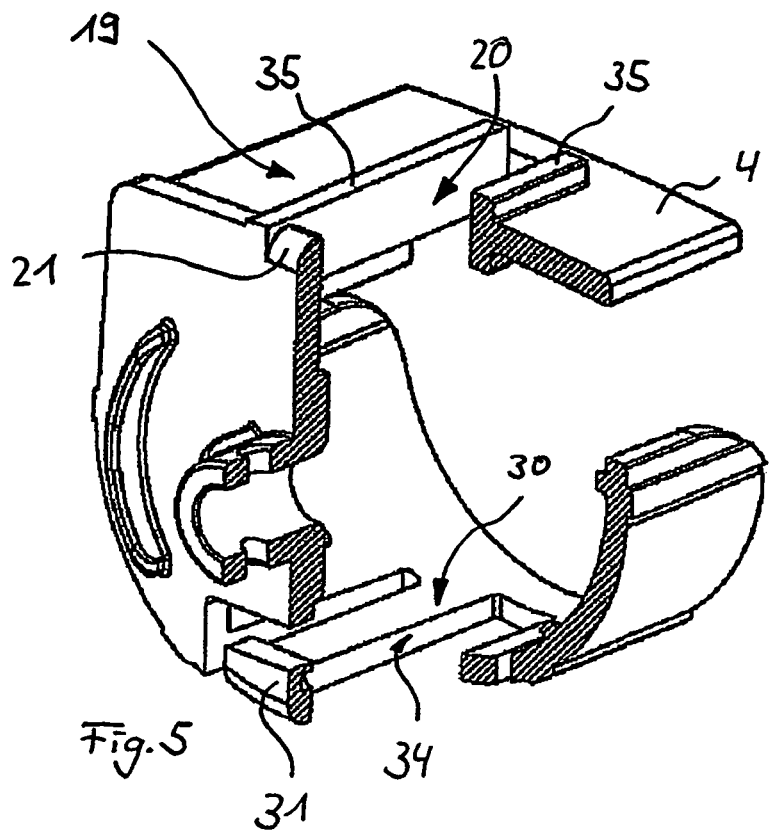

FIG. 5 A sectional perspective view of the end cap according to FIG. 4.

Figure 6:
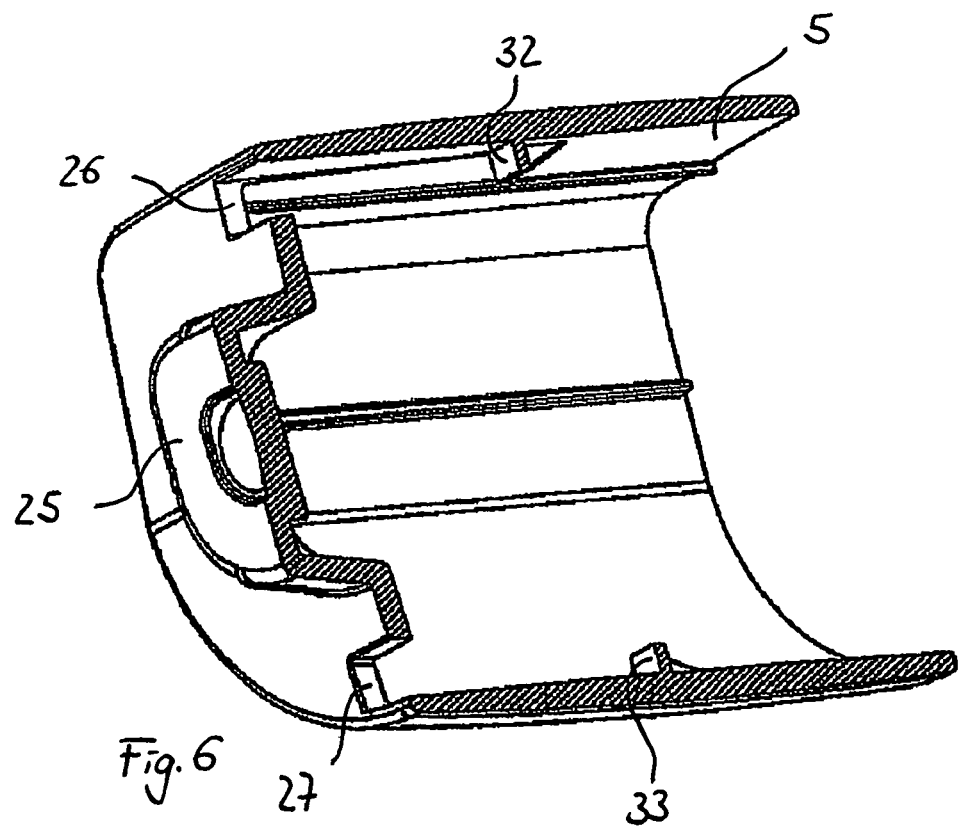

FIG. 6 A sectional perspective view of an adaptor part.

Figure 7:
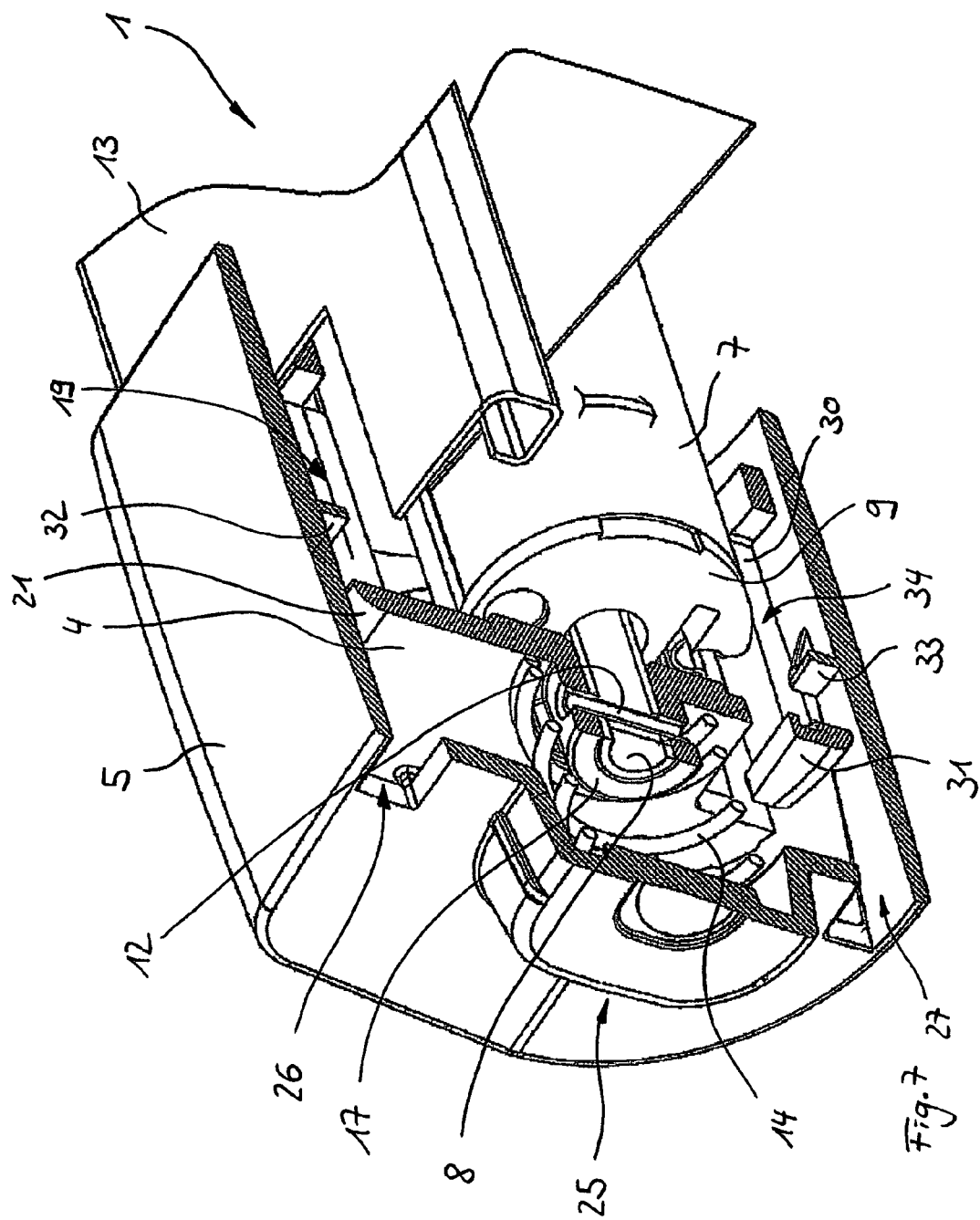

FIG. 7 A perspective detail enlargement of a sectionally represented end region of the protection device in an assembly representation.

A protection device 1 according to FIGS. 1 and 2 has a blind or screen functional unit 2 and adaptor parts 5 fitted terminally to end caps 4 of aid functional unit 2. The screen functional unit 2 comprises a screen shaft 7, which is mounted in rotary manner on a screen spindle 8 by means of bearing bushes 9 and which is provided for receiving a not shown flexible fabric in the form of a cover. For the storage of a winding up energy a winding spring 6 in the form of a helical spring is provided on the screen spindle 8 and with a L-shaped spring end region 10 is positively received in a reception groove 11 of bearing bush 9. The winding spring 6 is fitted in fixed manner to the screen spindle 8 by means of a not shown retaining rivet, whilst the end caps 4 are fixed permanently to the end regions of the screen spindle 8 by slotted pins 12.

A substantially L-shaped, angled, plastics part magazine housing 13 is mounted on the end caps 4 and is positively fitted and locked therewith. As a result of the design of the protection device 1 with an independently functional screen functional unit 2, in which a rigid connection suitable for force transfer is provided between the end caps 4 by means of the screen spindle 8, the magazine housing 13 essentially fulfils a decorative function and a protection function for covering the screen shaft 7. If at all, there is only a limited force transfer between the end caps 4 via magazine housing 13.

The adaptor parts 5 are in each case fitted elastically by means of compression springs 14 with respect to the end caps 4 and are slidably mounted by means of locking devices in the form of locking profilings to be described hereinafter on end caps 4 between a rest position according to FIG. 1 and a not shown functioning position.

The winding spring 6 is provided with two co-axially arranged damping sleeves 15, 16, which bring about soundproofing during the winding up and down process of the flexible fabric and act both in the rest and functioning state of protection device 1.

According to FIGS. 3 and 7 the end cap 4 has a series of functional structures, which will be described in greater detail hereinafter. On a face of the end cap 4 facing the adaptor part 5 is provided a reception bush 17, which extends in the direction of adaptor part 5 and receives both the screen spindle 8 and the compression spring 14. The screen spindle 8 is inserted in a hole of the reception bush 17 and is positively fixed with the slotted pin 12 oriented orthogonally to a median longitudinal axis 18. The compression spring 14 is arranged on the outer circumference of and concentrically to the reception bush 17 and has an end turn on the face of end cap 4. On a top surface of the end cap 4 is provided a sliding guide 19 for a positive reception of the magazine housing 13, which is constructed as an extruded plastics profile and zonally embraces the end cap 4. The sliding guide 19 has a recess bounded by guide webs 35 in the form of a guide slot 20, shown in greater detail in FIGS. 4 and 5 and is bounded in the direction of the adaptor part 5 by a wedge portion 21. The magazine housing 13 provided with a correspondingly designed slot is positively received on an outside of the guide webs 35 projecting in raised manner from the top of the end cap 4. The guide webs 35 also serve as spacers for the adaptor part 5, which can slide with an inner face on the top of the guide web 35 and consequently, in the case of a suitable material pairing, is displaceable with virtually no noise, so that even when the protection device is in use there are no squeaking noises or the like caused by vibrations. As there is no or virtually no force transfer between the magazine housing 13 and the end caps 4, the slot in the magazine housing 13 can be manufactured with an inexpensively produced, large tolerance. It is also possible to have a clearance-accompanied fit between the end caps 4 and magazine housing 13 making it easier to provide noise damping measures, e.g. through textile strips, between the end cap 4 and magazine housing 13.

The wedge portion 21 permits a simple fitting of the adaptor part 5, on whose inner wall is provided a detent 32, shown in detail in FIG. 6, constructed so as to correspond to the guide slot 20 and which is part of the locking profiling. On mounting the adaptor part 5 on end cap 4 the detent 32 slides over wedge portion 21 and is slidingly received in the guide slot 20. A detent 33 also slides into a subsequently described recess in the form of a slot 34.

On a lateral region of end cap 4 is provided an extraction slot 22, which permits a winding up and down of the flexible fabric 4 received on screen shaft 7. The flexible fabric is fixed in a first, terminal region to the screen shaft 7 and has on a second, terminal region an extraction rod 23, which allows a comfortable gripping of the cover by an operator. The extraction rod 23 is equipped with cylindrical end regions for reception in vehicle-fixed locking grooves.

In the rest position of the protection device shown in FIG. 3 the cylindrical end region of the extraction rod 23 participates in a positive operative connection with the lateral surface 24 of end cap 4, which limits a winding up process of the flexible fabric on screen shaft 7. This operative connection ensures, even without fitted adaptor parts 0.5, that a preloading stored in the spring mechanism 6 is maintained in the wound up state of the flexible fabric.

Both the end cap 4 and adaptor part 5 have a circumferential, sectorwise substantially U-shaped cross-section, the adaptor part 5 being constructed for a sliding reception of the end cap 4. As a result of the sectorwise U-shaped cross-section a positive torque transmission is made possible between end cap 4 and adaptor part 5 by means of the supporting sections formed by the outer faces of the zonally U-shaped end cap 4 and which as a result of the positive reception of the end cap 4 in the adaptor part 5 come into operative connection with inner faces of the adaptor part 5. In an end region remote from the end cap 4, the adaptor part 5 has a raised bolt structure 25, which is provided for positive locking in a vehicle interior. The bolt structure 25 is provided with a substantially square cross-section with rounded corners and therefore permits a force and torque transmission to the vehicle. On the adaptor part 5 are terminally provided engagement openings 26, 27 allowing access to not shown bolt button 31 shown in FIGS. 5 and 7 thereby permitting a disassembly of adaptor part 5 with respect to end cap 4.

The adaptor part 5 is provided with a through slot 28, which corresponds to the extraction slot 22 of end cap 4 and which, independently of the position of adaptor part 5 relative to end cap 4, allows an unimpeded winding up or down of the flexible fabric 3 with respect to screen shaft 7.

As shown in greater detail in FIG. 4, the end cap 4 is provided on an inner face with reinforcing ribs 29 supporting an end region of end cap 4 and thereby bringing about an advantageous stiffening. On an underside of the end cap 4 is provided a bolt button 31 shown in detail in FIGS. 4 and 5 secured by means of a solid state joint 30 to the end cap 4 provided with a recess in the form of a slot 34 for reception in the detent 33 of adaptor part 5 and which permits a tool-free coupling of adaptor part 5 to end cap 4 by means of a locking connection.

An uncoupling of the adaptor part 5 from the end cap 4 can be carried out by deflecting the bolt button 31, e.g. using a screwdriver. The screwdriver blade is brought up to the bolt button 31, in order to deflect it from the rest position shown in FIGS. 4, 5 and 6. This makes it possible to disconnect the positive connection between end cap 4 and adaptor part 5, so that adaptor part 5 can be drawn off end cap 4. The guide slot 20 on end cap 4 and the slot 34 form the recesses in which can positively engage the detents 32, 33 on adaptor part 5. The locking profilings formed by slots 20, 34 and detents 32, 33 ensure a linearly movable guidance and an axially positive locking of adaptor part 5 to end cap 4.

Both end cap 4 and adaptor part 5 in the embodiment shown are constructed as plastic injection mouldings and if there is an appropriate material selection a crashproof anchoring of the screen functional unit 2 in the motor vehicle interior is ensured. The magazine housing 13, which essentially has a decorative function, besides a construction in the form of a plastic extruded part or plastic injection moulding part can be constructed as an aluminium extrudate or as a bevelled, painted or otherwise coated sheet metal part, so that there are numerous design possibilities allowing a particularly advantageous adaptation to different vehicles.

For the installation of the protection device, the inner damping sleeve 15 is slid onto the screen spindle 8, the winding spring 6 is then slid onto the damping sleeve 15 and fixed to the screen spindle 8 by means of a rivet joint. The outer damping sleeve 16 is then slid onto the winding spring 6 and the spring end region 10 is slid into the reception groove 11 of bearing bush 9. The screen shaft 7 is then slid onto bearing bush 9 and positively locked by the detent of bearing bush 9. Onto the opposite end region of screen shaft 7 is also slid a bearing bush 9 which is positively locked, so that overall a plain bearing is brought about between the screen shaft 7 and screen spindle 8. In a following operating step an end cap 4 is in each case terminally slid onto the screen spindle 8 and secured by a slotted pin 12. This brings about a rigid connection between the end caps 4 by means of the screen spindle 8 by means of which the forces introduced into the flexible flat structure can be led off into the adaptor parts 5 and therefore into the vehicle. As a function of the area of use, between the end caps 4 can be received a magazine housing 13, which partly or at least entirely completely embraces the screen shaft 7 and virtually has no function during the transmission of forces and torques between the flexible flat structure, the end caps, the adaptor parts and the vehicle. Thus, the screen functional unit 2 is prefitted as an independent subassembly.

In a following operating step compression springs 14 are engaged on the reception bushes 17 of end caps 4 and adaptor parts 5 are slid onto end caps 4. Detents 32, 33 provided in the adaptor parts 5 in each case slide over the wedge portions 21 of end caps 4 and consequently bring about a displaceable, positive operative connection between end caps 4 and adaptor parts 5.

For the installation of the protection device 1 in a motor vehicle oppositely directed forces are exerted on the adaptor parts 5 in the direction of the median longitudinal axis 18, so that compression springs 14 are compressed and adaptor parts 5 approach one another. In this state the protection device 1 can be inserted in a correspondingly shaped receptacle of a vehicle interior. After reducing the operating force there is an automatic locking of the adaptor parts 5 in the vehicle interior.

The screen functional unit 2 in itself constitutes a functional protection device, because the flexible fabric 3 can be wound up and down with respect to the screen shaft 7 and as a result of the operative connection between the end caps 4 and extraction rod 23 it is ensured that a spring preloading of winding spring 6 is not lost in the wound up rest position of the flexible fabric 3. The screen functional unit 2 can be adapted in vehicle-individual manner by the mounting of adaptor parts 5. As a result of the rigid connection between the end caps 4 via screen spindle 8 forces acting on the flexible flat structure are transmitted directly from the screen shaft 7 to the end caps 4 and do not, as in the known protection devices, have to be passed between the end caps via a dimensionally stable and therefore expensive magazine housing.

The invention claimed is:

1. Protection device for a motor vehicle with a screen functional unit, which comprises a flexible fabric which can be wound up and down on a screen shaft and which is terminally provided with adaptor parts fittable to at least partially surround end caps of the screen functional unit for a vehicle-specific fitting in a vehicle interior, wherein the screen shaft is mounted in rotary manner on the end caps and wherein at least one end cap has at least two circumferentially mutually spaced supporting sections bearing on a respective one of said adaptor parts for a positive force transmission, and wherein the at least one end cap has at least one guide groove for a slidable guidance of the respective one of said adaptor parts.

2. Protection device according to claim 1, wherein the supporting sections the end cap are substantially U-shaped in cross-section in a plane normal to a rotation axis of the screen shaft.

3. Protection device according to claim 2, wherein the at least one end cap has at least one guide web for engaging the adaptor part, extended in the axial direction of the screen shaft.

4. Protection device for a motor vehicle with a screen functional unit, which comprises a flexible fabric which can be wound up and down on a screen shaft and which is terminally provided with adaptor parts fittable to at least partially surround end caps of the screen functional unit for a vehicle-specific fitting in a vehicle interior, wherein the screen shaft is mounted in rotary manner on the end caps and wherein at least one end cap has at least two circumferentially mutually spaced supporting sections bearing on a respective one of said adaptor parts for a positive force transmission, and wherein the screen shaft has terminally fitted bearing bushes for a rotary operative connection with a coaxially arranged screen spindle and the end caps are firmly connected to end portions of the screen spindle.

5. Protection device according to claim 4, wherein the screen functional unit is designed for the winding up and down of the flexible fabric by a spring mechanism and has stop means for maintaining a pretension of the spring mechanism in the wound up position.

6. Protection device according to claim 5, wherein at least one bearing bush is constructed as a receptacle for an end region of the spring mechanism.

7. Protection device according to claim 6, wherein at least one bearing bush has a radially extended, circumferential collar with a diameter larger than the internal diameter of the screen shaft.

8. Protection device according to claim 6, wherein at least one bearing bush has locking means constructed for positive reception in the screen shaft.

9. Protection device according to claim 4, wherein the end caps are constructed as stop means for a dimensionally stable extraction profile provided on the flexible fabric, so that in a wound up state of the flexible fabric a preloading of the spring mechanism can be maintained.

10. Protection device according to claim 5, wherein at least one of said adaptor parts is movably fitted to an end cap.

11. Protection device according to claim 10, wherein said at least one adaptor part is linearly movably guided relative to the end cap in the direction of a central axis of the screen shaft by interengaging locking profilings on said end cap and is limited in axial positive manner.

12. Protection device according to claim 11, wherein the locking profilings are formed by at least one recess and at least one detent associated with said at least one adaptor part and the end cap.

13. Protection device according to claim 5, wherein at least one of said adaptor parts is replaceably fitted to an end cap.

14. Protection device according to claim 11, wherein a spring mechanism is provided between the end cap and said at least one adaptor part.

15. Protection device according to claim 5, wherein a covering at least partly embracing the screen shaft is fitted between the end caps.

16. Protection device according to claim 4, wherein the spring mechanism is constructed as a helical spring with which is at least partly associated a coaxially positioned damping sleeve.

17. Protection device according to claim 5, wherein the screen functional unit with the at least one adaptor part can be locked in crashproof manner to a motor vehicle interior.

18. Protection device according to claim 5, wherein a magazine housing is constructed as a stop means for a dimensionally stable extraction profile provided on the flexible fabric, so that the extraction profile can be constructed shorter than a minimum spacing between the end caps.

19. Protection device for a motor vehicle with a screen functional unit comprising a flexible fabric wound on a screen shaft, and which is terminally provided with adaptor parts fittable to end caps of said screen functional unit for adapting said screen functional unit to a vehicle interior, wherein said screen shaft is mounted in rotary manner on said end caps and wherein at least one of said end caps includes at least one supporting section designed for a positive force transmission to said adaptor part, said supporting section of the end cap being substantially U-shaped in a cross-section taken in a plane normal to a rotation axis of the screen shaft, and at least one guide web for a respective one of said adaptor parts extended in the axial direction of the screen shaft, wherein the guide web extends from said end cap circumferentially opposite said supporting section to engage the respective adaptor part and hold said end cap in a spaced relationship within the respective adaptor part.

* * * * *